(12) United States Patent
Triebe et al.

(10) Patent No.: US 8,757,110 B2
(45) Date of Patent: Jun. 24, 2014

(54) COOLANT CIRCUIT

(75) Inventors: Steffen Triebe, Reichertshofen (DE); Dieter Lachner, Gaimersheim (DE); Stefan Rank, Germering (DE); Stephan Adam, Lenting (DE); Markus Störmer, Berching (DE)

(73) Assignee: Audi AG, Ingolstadt (DE)

( * ) Notice: Subject to any disclaimer, the term of this patent is extended or adjusted under 35 U.S.C. 154(b) by 370 days.

(21) Appl. No.: 13/318,863

(22) PCT Filed: May 4, 2010

(86) PCT No.: PCT/EP2010/002716
§ 371 (c)(1),
(2), (4) Date: Nov. 4, 2011

(87) PCT Pub. No.: WO2010/127826
PCT Pub. Date: Nov. 11, 2010

(65) Prior Publication Data
US 2012/0048217 A1   Mar. 1, 2012

(30) Foreign Application Priority Data

May 6, 2009   (DE) .......................... 10 2009 020 187

(51) Int. Cl.
*F01P 7/14* (2006.01)
*F16K 5/10* (2006.01)
*F04B 49/00* (2006.01)
*F01P 5/10* (2006.01)

(52) U.S. Cl.
CPC ... *F01P 7/14* (2013.01); *F16K 5/10* (2013.01); *F04B 49/00* (2013.01); *F01P 5/10* (2013.01)
USPC ................... 123/41.1; 123/41.29; 123/41.44; 417/423.1

(58) Field of Classification Search
CPC .............. F01P 7/165; F01P 7/16; F01P 7/14; F01P 7/167; F01P 3/14; F01P 3/18; F01P 5/10; F01P 5/12; F01P 7/164; F01P 2007/146; F16K 3/34; F16K 3/08; F16K 5/12; F16K 5/10; F16K 11/074; F16K 11/0743; F16K 11/00; F16K 11/20; F04C 14/14; F04C 14/26; C02F 1/686; F23N 1/00; F04B 49/00

USPC ...................... 123/41.08–41.1, 41.44, 41.29; 236/34.5; 417/302, 423.1, 423.14; 137/565.11, 625.46, 625.15, 872, 887; 251/208, 209, 304

See application file for complete search history.

(56) References Cited

U.S. PATENT DOCUMENTS 4,628,872 A   12/1986   Ogawa et al.
(Continued)

FOREIGN PATENT DOCUMENTS

CN   101126528   2/2008
(Continued)

*Primary Examiner* — Noah Kamen
(74) *Attorney, Agent, or Firm* — Henry M Feiereisen LLC

(57) ABSTRACT

Coolant circuit, in particular a coolant circuit having a plurality of sub-circuits 1, 2, 3 of an internal combustion engine 11 includes a primary cooling circuit 1 and a heating circuit 2 as well as a coolant delivery pump 5 disposed on a rotary actuator 4, with the rotary actuator 4 having a rotary-slide housing 20 with several ports 8a, 8b, 9a, 9b, 10a through which coolant can flow, and a first and at least one second rotary slide 6 and 7 which are rotatably supported in the rotary-slide housing 20 and have each at least one rotary-slide pass-through opening 8, 9, 10 forming a flow path, wherein the ports 8a, 8b, 9a, 9b, 10a can be brought into at least partial coincidence with the rotary-slide pass-through openings 8, 9, 10 by a rotary motion of the respective rotary slide 6 and/or 7), wherein a first branch 1a of the primary cooling circuit 1 leads from the internal combustion engine 11 via a main radiator 12 to a main radiator port 8b of the first rotary slide and can be controlled by the first rotary slide 6, and that a second branch 1b of the primary cooling circuit 1 leads from an outlet 21 of the coolant delivery pump 5 to the internal combustion engine 11 and can be controlled by the second rotary slide 7.

16 Claims, 4 Drawing Sheets

(56) References Cited

U.S. PATENT DOCUMENTS

| | | |
|---|---|---|
| 5,529,026 A | 6/1996 | Kurr et al. |
| 6,164,248 A | 12/2000 | Lehmann |
| 6,481,387 B1 | 11/2002 | Sano |
| 6,539,899 B1 | 4/2003 | Piccirilli et al. |
| 7,168,397 B2 | 1/2007 | Chanfreau et al. |
| 7,721,683 B2 | 5/2010 | Lutz et al. |
| 2009/0139686 A1 | 6/2009 | Suzuki |
| 2010/0282190 A1 | 11/2010 | Stoermer |

FOREIGN PATENT DOCUMENTS

| | | |
|---|---|---|
| CN | 101348111 | 1/2009 |
| DE | 38 39 307 A1 | 5/1990 |
| DE | 41 31 357 C1 | 7/1992 |
| DE | 43 24 749 A1 | 1/1995 |
| DE | 198 09 124 A1 | 9/1999 |
| DE | 198 31 901 A1 | 1/2000 |
| DE | 199 21 421 A1 | 11/2000 |
| DE | 199 43 981 A1 | 3/2001 |
| DE | 699 35 923 T2 | 8/2001 |
| DE | 100 37 823 A1 | 2/2002 |
| DE | 103 06 094 A1 | 9/2003 |
| DE | 602 09 019 T2 | 4/2004 |
| DE | 102008007766 | 8/2009 |
| EP | 0 940 565 A2 | 9/1999 |
| EP | 1 201 889 A1 | 5/2002 |
| EP | 1 942 038 A1 | 7/2008 |
| EP | 1 947 308 A1 | 7/2008 |
| JP | 10-077837 | 3/1998 |
| JP | 2006-242073 | 9/2006 |
| WO | WO 03/006857 | 1/2003 |
| WO | WO 03/048539 | 6/2003 |
| WO | WO 2008/049624 | 5/2008 |

COOLANT CIRCUIT

CROSS-REFERENCES TO RELATED APPLICATIONS

This application is the U.S. National Stage of International Application No. PCT/EP2010/002716, filed May 4, 2010, which designated the United States and has been published as International Publication No. WO 2010/127826 and which claims the priority of German Patent Application, Serial No. 10 2009 020 184.4, filed May 6, 2009, pursuant to 35 U.S.C. 119(a)-(d).

BACKGROUND OF THE INVENTION

A cooling circuit of an internal combustion engine and having a plurality of sub-circuits for a motor vehicle with a device for operating such a coolant circuit, in particular for control of the coolant flow in the individual sub-circuits.

Such coolant circuits are preferably used for thermal management of an internal combustion engine, with the coolant flow being dispersed between the sub-circuits of the coolant circuit by a device for operating the coolant circuit such as to establish an optimum operating temperature of the internal combustion engine in a quickest possible way.

DE 602 09 019 T2 discloses a control valve for a cooling circuit of an internal combustion engine, with coolant flowing through the circuit which has a first branch which contains a radiator of the engine, a second branch that constitutes a branch line of the radiator, and one or more third branches, each of which having at least one hot-air generator for heating the vehicle cabin. The control valve is formed as a body with a fluid inlet, a first outlet connected with the first branch, a second outlet connected to the second branch, and at least one third outlet connected to the third branch, wherein an adjustment member is arranged rotatably in the body so as to selectively control the outlets. By rotating the adjustment member in a given direction, a defined sequence of positions can be taken. In a first position the first outlet, connected to the branch line, is open; in a second position the second outlet, connected with the second branch, is open in addition to the first outlet; in a third position only the second outlet is open; in a fourth position the second and the third outlet, connected with the third branch, is open; in a fifth position all outlets are open; in a sixth position the first and the third outlet are open; and in a seventh position the first or the third outlet are open. Furthermore, the adjustment member may also assume a position in which no outlet is open.

Such a control valve is disadvantageous because the sequence of possible positions is rigidly predefined. Thus, positional changes are oftentimes required, when the coolant requirements change, so that the adjustment member has to be rotated accordingly frequently. As the control valve realized many functions by using only one adjustment member, the control valve is complex in structure requiring a plurality of components, causing problems in connection with wear and tightness.

DE 103 06 094 A1 discloses a combustion engine cooling system for a vehicle with a coolant pump, an engine circuit for conducting the coolant through the engine, a radiator circuit for conducting the coolant through the radiator, a bypass circuit for returning the coolant to the engine circuit without passing through the radiator circuit, and a heater circuit for conducting the coolant through the heater core. A rotary valve for switching the coolant is described and includes a valve body having an inlet port and a plurality of outlet ports, with the outlet ports including a radiator port for conducting the coolant in a radiator circuit, a bypass port for conducting the coolant in a bypass circuit, and a heater port for conducting the coolant in a heater circuit. The valve body further includes a rotationally supported flow diverter with a plurality of fluid passages providing predetermined flow paths between the inlet port and the outlet ports in response to a rotational position of the flow diverter. The predetermined flow paths include a first operating mode for distributing the coolant to the radiator port and the heater port while blocking the bypass port at the same time, a second operating mode for distributing the coolant to the bypass port while blocking coolant from the radiator port and the heater port at the same time, a third operating mode for distributing the coolant to the heater port while blocking the coolant from the radiator port and the bypass port, and a fourth operating mode for distributing the coolant to the radiator port and to the bypass port while blocking the coolant from the heater port at the same time.

Such a combustion engine cooling system is disadvantageous because the structure of the rotary valve results in a restriction of the controllable circuits. Incorporation of further circuits necessarily leads to a poorer control of the individual circuits. As a result, the coolant temperature can no longer be adjusted with sufficient precision and speed to the desired value, diminishing the ability of the internal combustion engine to reach the operating temperature.

SUMMARY OF THE INVENTION-

It is an object of the present invention to provide a coolant circuit which is simple in structure while allowing a comprehensive control of a plurality of sub-circuits of the coolant circuit.

This object can be attained by a coolant circuit, in particular a coolant circuit having a plurality of sub-circuits of an internal combustion engine, has a primary cooling circuit and a heating circuit and includes a coolant delivery pump disposed on a rotary actuator, with the rotary actuator having a rotary-slide housing with several ports through which coolant can flow, and a first and at least one second rotary slide rotatably supported in the rotary-slide housing and having each at least one rotary-slide pass-through opening forming a flow path, wherein the ports can be brought into at least partial coincidence with the rotary-slide pass-through openings by a rotary motion of the respective rotary slide, and wherein a first branch of the primary coolant circuit leads from the internal combustion engine via a main radiator to a main radiator port of the first rotary slide and can be controlled by the first rotary slide, and wherein a second branch of the primary coolant circuit leads from an outlet of the coolant delivery pump to the internal combustion engine and can be controlled by the second rotary slide.

As the two branches of the primary cooling circuit are controlled by different rotary slides, it is possible to control a plurality of sub-circuits of the coolant circuit. The supply lines of the individual sub-circuits are hereby connected to the first rotary slide which is in fluid communication with a suction port of the coolant delivery pump. By rotating the first rotary slide in relation to the rotary-slide housing, the rotary-slide pass-through openings of the first rotary slide can be brought into coincidence in an infinitely variable manner with the respective ports of the rotary-slide housing and to thereby control various flow paths with varying flow rates. The control of the return flow of the coolant from the coolant delivery pump is realized in a second branch of the primary cooling circuit by the second rotary slide. Regardless of the momentary position of the first rotary slide, a coolant flow can be opened or closed in an infinitely variable manner from the coolant delivery pump to the internal combustion engine. The second rotary slide may hereby be configured in a very simple manner as rotation body with a through bore as rotary-slide pass-through opening which corresponds with two opposing ports of the rotary-slide housing. This very simple configuration of the rotary actuator allows a precise control of relatively many sub-circuits in a cost-efficient manner.

According to a preferred embodiment, the heating circuit branches upstream of the second rotary slide from the second branch of the primary cooling circuit and routes coolant to the internal combustion engine via a heating heat exchanger. As the heating circuit branches from the second rotary slide, the heating circuit receives heated coolant from the coolant delivery pump at all times, regardless of the position of the second rotary slide, thereby contributing to a prompt heating of the vehicle cabin in the motor vehicle by the heating heat exchanger.

According to a preferred embodiment, a bypass branches from the first branch of the primary cooling circuit downstream of the internal combustion engine to a bypass port of the first rotary slide, with the first rotary slide controlling the bypass. Heated coolant from the internal combustion engine flows through the bypass to the bypass port of the first rotary slide without being cooled down by the main radiator. Coolant at elevated temperature from the bypass and coolant at lower temperature from the main radiator of the first branch of the primary cooling circuit is thus available at the first rotary slide and can be mixed at any mixing ratio through rotation of the first rotary slide.

According to a preferred embodiment, an oil cooler circuit routes coolant from the internal combustion engine via an oil cooler to an oil cooler port of the first rotary slide, with the first rotary slide controlling the oil cooler circuit. Heated coolant from the internal combustion engine flows through the oil cooler circuit to the oil cooler in which a heat exchange takes place with lubricant of the internal combustion engine. The coolant flows from the oil cooler to the oil cooler port of the first rotary slide for mixing with the coolant flow from the remaining sub-circuits.

According to a preferred embodiment, the second rotary slide closes the second branch of the primary cooling circuit after starting the internal combustion engine and/or below a first threshold value of the coolant temperature. When the coolant is at a relatively low temperature below a first threshold value, which is oftentimes the case after the start of the internal combustion engine, the second branch of the primary cooling circuit is closed by the second rotary slide so that no coolant can flow out of the coolant delivery pump back to the internal combustion engine. In the event the heating circuit is also closed, the coolant heats up especially rapidly in the internal combustion engine because of the absence of a circulation in the coolant circuit. Preferably, the first rotary slide closes in this phase the oil cooler port and the main radiator port while the bypass port is open. As a result, no coolant flows through any of the coolers in the coolant circuit during this phase.

According to a preferred embodiment, the first rotary slide opens the bypass between the first threshold value of the coolant temperature and a second threshold value of the coolant temperature, and the second rotary slide opens and closes the second branch of the primary cooling circuit in intervals. As soon as the coolant temperature rises above the first threshold value but is still below a second threshold value, the second rotary slide is rotated such as to conduct coolant in intervals. This results in a relatively small coolant flow with weak circulation of coolant within the internal combustion engine, leading to a more homogenous temperature distribution at the individual components of the internal combustion engine while still rapidly heating up the coolant. Preferably, the first rotary slide closes also in this phase the oil cooler port and the main radiator port whereas the bypass port is open.

According to a preferred embodiment, first rotary slide opens the bypass and the oil cooler circuit between the second threshold value of the coolant temperature and a third threshold value of the coolant temperature, and the second rotary slide opens the second branch of the primary cooling circuit. As soon as the coolant temperature rises above the second threshold value but is still below a third threshold value, the second rotary slide is permanently opened. The first rotary slide opens in this phase in addition the oil cooler port towards the bypass port, but preferably keeps the main radiator port still closed. As a result, heated coolant from the internal combustion engine is able to give off part of its heat in the oil cooler to the lubricant so that the latter is heated more rapidly.

According to a preferred embodiment, the first rotary slide opens between the third threshold value of the coolant temperature and a limit value of the coolant temperature the oil cooler circuit and opens and closes in intervals the first branch of the primary cooling circuit and the bypass to reach a target value of the coolant temperature, and the second rotary slide opens the second branch of the primary cooling circuit. As soon as the coolant temperature rises above the third threshold value but is still below a limit value, the coolant has reached approximately its intended target temperature whereupon the first rotary slide alternatingly opens and closes in intervals the bypass port and the main radiator port. As a result, a desired mixing ratio can be established between the two coolant flows at different temperature level for maintaining the target temperature.

According to a preferred embodiment, the coolant temperature is determined in the first branch of the primary cooling circuit downstream of the internal combustion engine. By determining the coolant temperature in the first branch of the primary cooling circuit at the coolant outlet of the internal combustion engine, it is fairly easy to draw inference about the coolant temperature in the internal combustion engine.

According to a preferred embodiment, first rotary slide opens during afterrun mode of operation after shutting down the internal combustion engine the first branch of the primary cooling circuit and closes the bypass, and the second rotary slide closes the second branch of the primary cooling circuit. As oftentimes the heat removal on the coolers is inadequate during the afterrun mode of operation after shutting down the internal combustion engine because of the lack of wind, the first rotary slide closes the second branch of the primary cooling circuit whereas the first rotary slide opens the main radiator port and the bypass port and closes the oil cooler port. As a result, coolant from the internal combustion engine can flow back to the internal combustion engine via the main radiator, the rotary actuator and the heating heat exchangers. As the main radiator and also the heating heat exchangers are circulated, the cooling area is increased, promoting better heat dissipation.

According to a preferred embodiment, a heater delivery pump arranged in the heating circuit circulates the coolant during the afterrun mode of operation. As a belt-operated coolant delivery pump can no longer provide any delivery rate, once the internal combustion engine has been shut down, the circulation is established during the afterrun mode of operation by an electrically-operated heater delivery pump in the heating circuit.

According to a preferred embodiment, a shut-off valve is arranged in the heating circuit, in particular upstream of the heater delivery pump, and is open during afterrun mode of operation. The shut-off valve is able to interrupt the supply of coolant to the heating heat exchanger when there is no demand for heating output in the vehicle cabin of the motor vehicle.

According to a preferred embodiment, the first rotary slide is arranged in coaxial relationship to the suction port of the coolant delivery pump, and the second rotary slide is arranged in axis-parallel relationship to the suction port of the coolant delivery pump. By arranging the first rotary slide with its axis of rotation in coaxial relationship to the axis of rotation of the suction port of the coolant delivery pump, the coolant delivery pump is able to easily draw coolant from the interior of the first rotary slide. The second rotary slide is arranged with its axis of rotation in axis-parallel relationship to the axis of rotation of the suction port of the coolant delivery pump with a fluid communication to the outlet of the coolant delivery pump so that the coolant delivery pump is able to convey coolant drawn from the first rotary slide to the second rotary slide. Especially advantageous is an arrangement of the second rotary slide in a radial circumferential area of the coolant delivery pump. Such an arrangement provides advantages when exploiting the installation space.

According to a preferred embodiment, the first rotary slide can be operated by a servo drive, and the second rotary slide is operatively connected with the first rotary drive via at least one angle range, with the second rotary slide being operated by the first rotary slide. By providing only the first rotary slide with a servo drive, costs and installation space can be saved. The operation of the second rotary slide is established indirectly by a toothing with the first rotary slide, with the first and second rotary slides meshing with one another only in an angle range.

According to a preferred embodiment, the angle range is limited by stops which the second rotary slide impacts, when the second rotary slide is not operatively connected with the first rotary slide. In the absence of an interaction of the second rotary slide with the first rotary slide, the second rotary slide bears upon one of the stops at the outer edge of the angle range while the first rotary slide is able to continue to rotate outside the angle range.

The following description of a preferred exemplary embodiment provides further details, features and advantages of the invention with reference to the drawings.

BRIEF DESCRIPTION OF THE DRAWING

It is shown in.

DETAILED DESCRIPTION OF PREFERRED EMBODIMENTS

Figure 1:
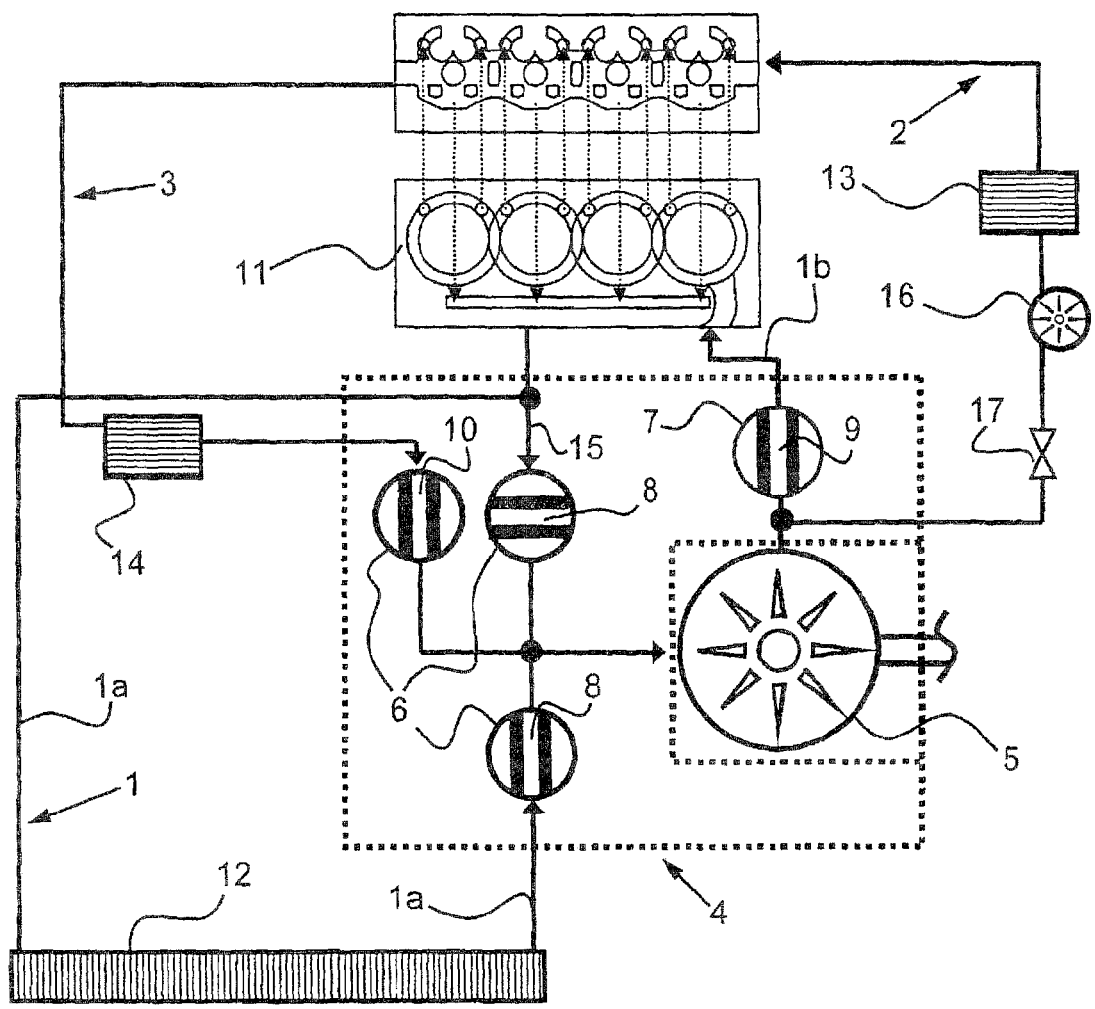
FIG. 1 an overview of a coolant circuit with a device for operating the coolant circuit.

According to FIG. 1, a cooling circuit for an internal combustion engine 11 has a primary cooling circuit 1, a heating circuit 2, an oil cooler circuit 3, and a rotary actuator 4 for controlling the coolant flows in the individual sub-circuits 1, 2 and 3. The rotary actuator 4 includes a rotary-slide housing with a first and a second rotatably supported rotary slide 6 and 7, the rotary-slide pass-through openings 8, 9 and 10. The rotary-slide housing has a wall provided with several ports through which coolant can flow and which can be brought into at least partial coincidence with the rotary-slide pass-through openings 8, 9 and/or 10 through a rotary motion of the rotary slides 6 and/or 7 to thereby form various flow paths for the connected sub-circuits 1, 2 and 3. A coolant delivery pump 5 is arranged on the rotary actuator 4 for drawing coolant from the first rotary slide 6 and conveying it into the second rotary slide 7. The internal combustion engine 11 essentially includes a cylinder block and a cylinder head through which coolant flows so that the heat quantity liberated in the cylinders of the internal combustion engine 11 during the combustion process can be transferred in part onto the coolant. A first branch 1a of the primary cooling circuit 1 conducts the heated coolant from the internal combustion engine 11 via a main radiator 12, which cools the coolant, to a main radiator port in the rotary-slide housing which main radiator port can be fluidly connected with the rotary-slide pass-through opening 8 of the first rotary slide 6. A bypass 15 branches from the first branch 1a of the primary cooling circuit 1 upstream of the main radiator 12 to a bypass port of the first rotary slide 6 which bypass port can be fluidly connected with the rotary-slide pass-through opening 8 of the first rotary slide 6. By rotating the first rotary slide 6, the rotary-slide pass-through opening 8 can be brought into at least partial coincidence with the bypass port and/or the main radiator port in order to thereby open or close the two flow paths from the internal combustion engine 11 to the coolant delivery pump 5 in an infinitely variable manner. A second branch 1b of the primary cooling circuit 1 leads from the outlet of the coolant delivery pump 5 via the second rotary slide 7 to the internal combustion engine 11. The second rotary slide 7 has a rotary-slide pass-through opening 9 which can be brought into at least partial coincidence with the ports of the second rotary slide 7 in the rotary-slide housing through a rotary motion of the second rotary slide 7 in order to thereby open or close a flow path from the coolant delivery pump 5 to the internal combustion engine 11 in an infinitely variable manner. The heating circuit 2 branches from the second branch 1b of the primary cooling circuit 1 upstream of the second rotary slide 7 and conducts coolant from the coolant delivery pump 5 via a shut-off valve 17, a heater delivery pump 16, and a heating heat exchanger 13 to the internal combustion engine 11. The shut-off valve 17 is closed in the absence of a demand for heating output, and the heater delivery pump 16 is preferably operated electrically in order to circulate coolant through the coolant circuit when the delivery capacity of the coolant delivery pump 5 is too low. Furthermore, an oil cooler circuit 3 conducts coolant from the internal combustion engine 11 via the oil cooler 14 to an oil cooler port in the rotary-slide housing. The first rotary slide 6 has a further rotary-slide pass-through opening 9 which can be brought into at least partial coincidence with the oil cooler port in order to thereby open or close a flow path from the internal combustion engine 11 to the coolant delivery pump 5 in an infinitely variable manner. The oil cooler 14 is hereby provided to maintain the lubricant of the internal combustion engine 11 at moderate temperature.

Figure 2:
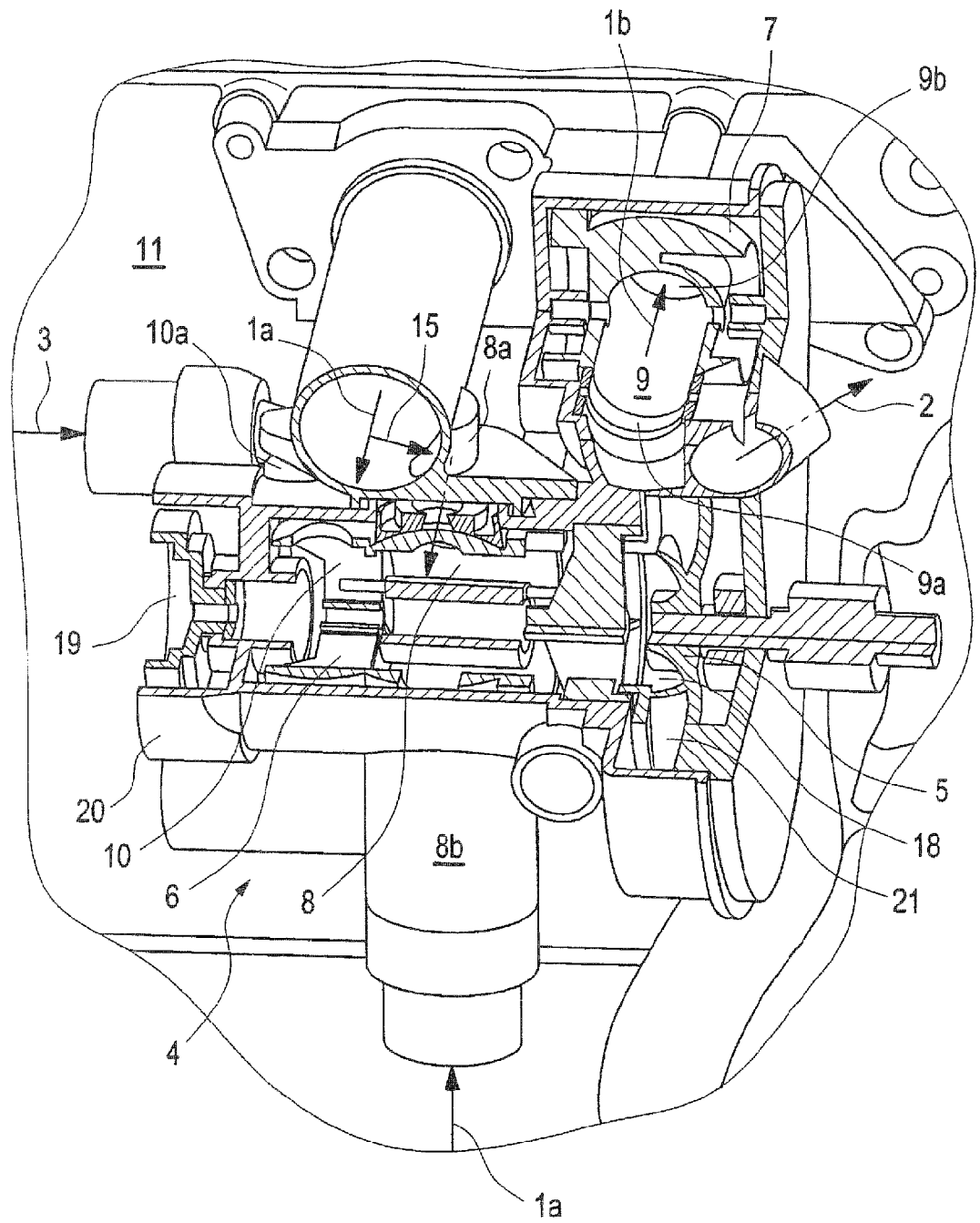
FIG. 2 a sectional view of a rotary actuator.

According to FIG. 2, a rotary actuator 4 is arranged at the outer wall of the internal combustion engine 11 and includes a rotary-slide housing 20 with a first and a second rotatably supported rotary slide 6 and 7 which are configured preferably as rotation body with an interior volume. The walls of the rotary slides 6 and 7 have rotary-slide pass-through openings 8, 9 and 10 via which the rotary slides 6 and 7 can be acted upon with coolant. Arranged on the first rotary slide 6 is a preferably belt-operated coolant delivery pump 5 having a suction port 18 in fluid communication with the first rotary slide 6, and an outlet 21 in fluid communication with the second rotary slide 7. The first rotary slide 6 is directly operated by a servo drive 19 via a rotation axis whereas the second rotary slide 7 can be operated by the first rotary slide 6. Provided on the rotary-slide housing 20 are several ports 8a, 8b, 9a, 9b and 10a through which coolant can flow. Through a rotary motion of the first rotary slide 6 and/or second rotary slide 7, the ports 8a, 8b, 9a, 9b and/or 10a can be brought into at least partial coincidence with the respective rotary-slide pass-through openings 8, 9 and/or 10 in order to thereby open and close various flow paths in an infinitely variable manner. A bypass port 8a which can be acted upon by coolant from a bypass 16 and a main radiator port 8b which can be acted upon by coolant from a first branch 1a of the primary cooling circuit are associated to the rotary-slide pass-through opening 8 of the first rotary slide 6. Associated to the further rotary-slide pass-through opening 10 of the first rotary slide 6 is an oil cooler port 10a which can be acted upon by coolant from oil cooling circuit 3. Associated to the rotary-slide pass-through opening 9 of the second rotary slide 7 are two opposing ports 9a and 9b which are positioned about the second rotary slide as to establish a uniform overlap of both ports 9a and 9b with the rotary-slide pass-through opening 9 at all times. The second rotary slide 7 controls the second branch 1b of the primary cooling circuit which leads from the outlet 21 of the coolant delivery pump 5 to the internal combustion engine 11 and from which the heating circuit 2 branches upstream of the second rotary slide 7.

Figure 3:
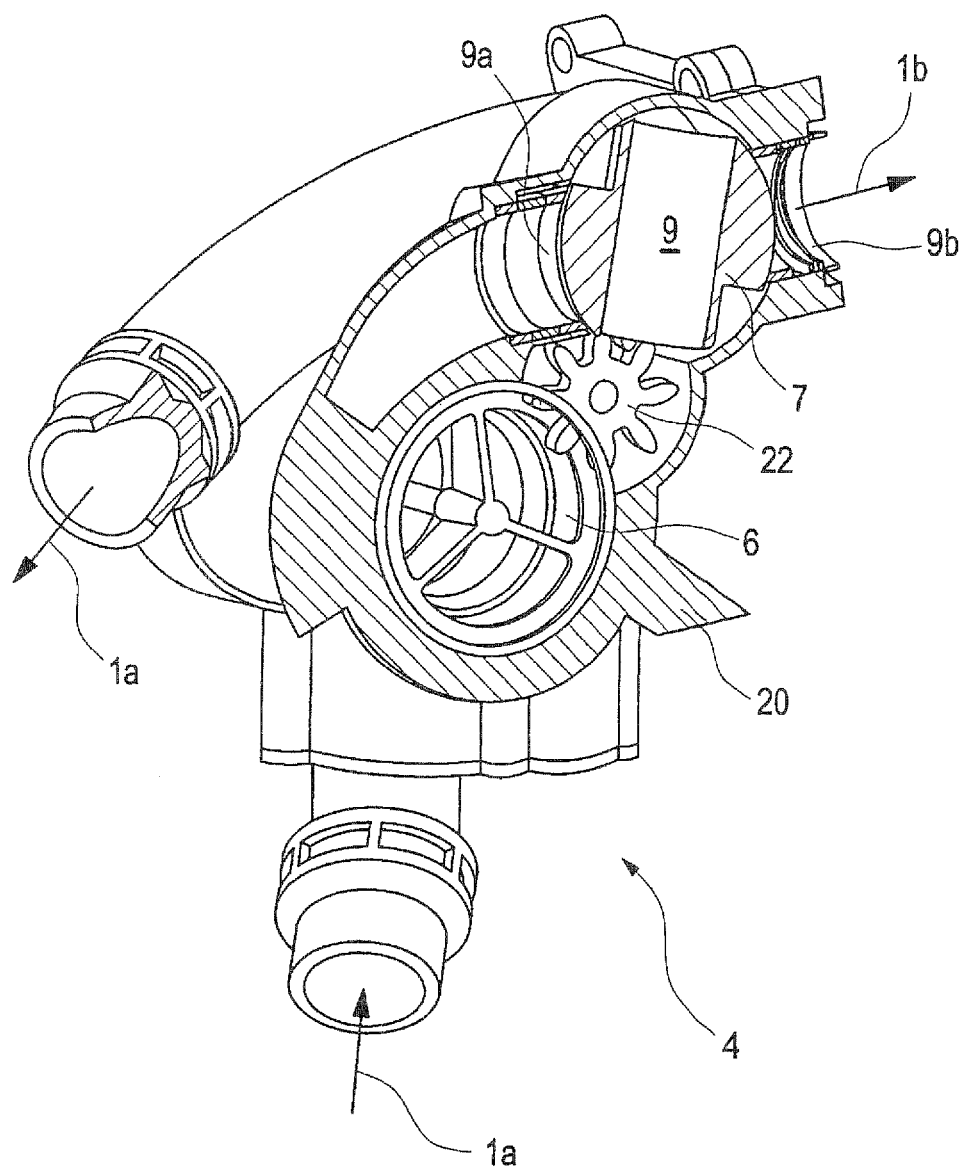
FIG. 3 a sectional view of a rotary actuator.

According to FIG. 3, a rotary actuator 4 has a rotary-slide housing 20 in which a first rotary slide 6 and a second rotary slide 7 are rotatably supported, with the first rotary slide 6 being directly operated and the second rotary slide 7 operatively connected with the first rotary slide 6 over a defined angle range by a gear 22 and thereby operated by the first rotary slide. The second rotary slide 7 has a rotary-slide pass-through opening 9 which can be brought into at least partial coincidence with the ports 9a and 9b, arranged on both sides of the second rotary slide 7, through a rotary motion in order to thereby open and close a flow path in an infinitely variable manner. As a result, coolant flows from the internal combustion engine via the first branch 1a of the primary cooling circuit through the first rotary slide 6 and is conveyed by a coolant delivery pump towards the second rotary slide 7. Depending on the position of the second rotary slide 7 in relation to the ports 9a and 9b, coolant can pass the second rotary slide 7 and flow into a second branch 1b of the primary cooling circuit back to the internal combustion engine.

Figure 4:
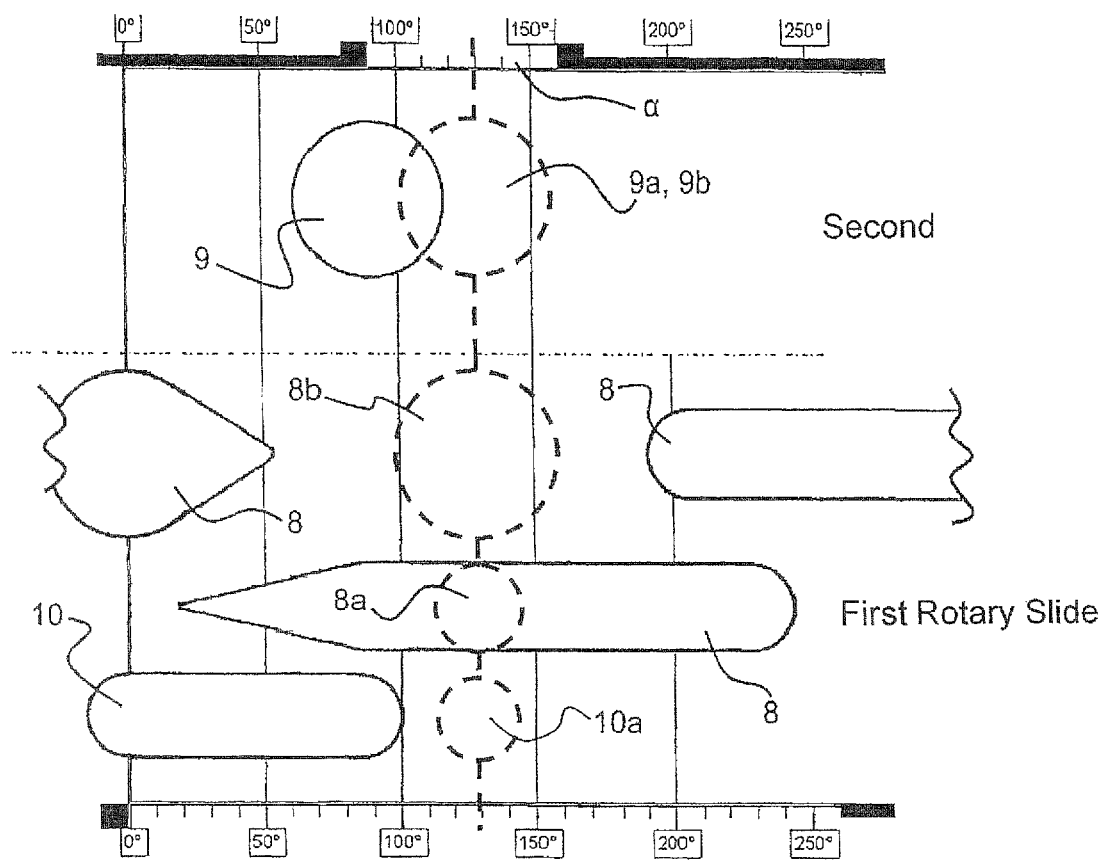
FIG. 4 a representation of the flow cross sections that can be adjusted as a result of the overlap of the ports with the rotary-slide pass-through opening.

According to FIG. 4, radially distributed rotary-slide pass-through openings 8, 9 and 10 are arranged on the first and the second rotary slide. Through a rotary motion of the first and/or the second rotary slide, ports 8a, 8b, 9a, 9b and 10a, arranged fixed on a rotary-slide housing, can be brought into at least partial coincidence with the associated rotary-slide pass-through openings 8, 9 and/or 10. Attention should be given that the ports 9a and 9b are arranged on the second rotary slide in such a way that a rotation thereof results in an uniform overlap of both ports 9a and 9b with the rotary-slide pass-through opening 9. The second rotary slide can be shifted jointly with the first rotary slide over an angle range $\alpha$ which is preferably between 90° and 160° rotation. The first rotary slide can move beyond the angle range $\alpha$ from an initial position at 0° to an end position at about 260°, with the second rotary slide impacting a left or right stop on the outer boundaries of the angle range $\alpha$ when the first rotary slide does not sweep over the angle range $\alpha$. After starting the internal combustion engine and below a first threshold value of the coolant temperature, the first and the second rotary slide are operatively connected, with the first rotary slide allowing passage of coolant from the bypass port 18a and the second rotary slide impacting the right stop of the angle range $\alpha$ so no coolant can pass. After exceeding the first threshold value and below a second threshold value of the coolant temperature, the second rotary slide moves jointly with the first rotary slide away from the right stop of the angle range $\alpha$ and conducts coolant intermittently from the bypass port 8a via the first rotary slide through the ports 9a and 9b of the second rotary slide. After exceeding the second threshold value and below a third threshold value of the coolant temperature, the second rotary slide impacts the left stop of the angle range $\alpha$ so that the ports 9a and 9b of the second rotary slide are fully open. Coolant from the oil cooler port 10a and the bypass port 8a thus flows into the first rotary slide. After exceeding the third threshold value and below a limit value of the coolant temperature, the first rotary slide continues to move in the direction of the initial position while the second rotary slide continues to bear upon the left stop of the angle range $\alpha$. Coolant from the oil cooler port 10a thus flows continuously into the first rotary slide, with a continuous shifting of the first rotary slide allowing establishment of a defined mixing ratio of coolant from the bypass port 8a and coolant from the main radiator port 8b until a target temperature of the coolant is reached. During an afterrun mode of operation after shutting down the internal combustion engine, the first rotary slide moves the second rotary slide to the right stop of the angle range $\alpha$ so that coolant can no longer flow through the ports 9a and 9b of the second rotary slide. The first rotary slide continues to rotate in the direction of the end position so that only coolant from the main radiator port 8b can pass through.

The invention claimed is:

1. A coolant circuit of an internal combustion engine, comprising:
    a primary cooling circuit having a first branch leading from the internal combustion engine, and a second branch leading to the internal combustion engine;
    a main radiator disposed in the first branch;
    a rotary actuator; and
    a coolant delivery pump disposed on the rotary actuator and having an outlet fluidly connectable to the internal combustion engine via the second branch,
    said rotary actuator including:
        a rotary-slide housing,
        a first rotary slide having at least one rotary-slide pass-through opening and being supported in the rotary-slide housing for rotation to allow at least partial coincidence of the at least one rotary-slide pass-through opening with a main radiator port of the rotary-slide housing to thereby control a flow of coolant through the first branch from the internal combustion engine via the main radiator to the at least one rotary-slide pass-through opening of the first rotary valve; and
        a second rotary slide having at least one rotary-slide pass-through opening and being supported in the rotary-slide housing for rotation to allow at least partial coincidence with a further port of the rotary-slide housing to thereby control a flow of coolant through to the second branch from the outlet of the coolant delivery pump to the internal combustion engine.

2. The coolant circuit of claim 1, further comprising a heating circuit branching upstream of the second rotary slide from the second branch of the primary cooling circuit and routing coolant to the internal combustion engine via a heating heat exchanger disposed in the heating circuit.

3. The coolant circuit of claim 2, further comprising a heater delivery pump arranged in the heating circuit to circulate coolant during an afterrun mode of operation.

4. The coolant circuit of claim 3, further comprising a shut-off valve arranged in the heating circuit and being open during the afterrun mode of operation.

5. The coolant circuit of claim 4, wherein the shut-off valve is arranged upstream of the heater delivery pump.

6. The coolant circuit of claim 1, further comprising a bypass branching from the first branch of the primary cooling circuit downstream of the internal combustion engine to a bypass port of the rotary-slide housing, said first rotary slide controlling a flow of coolant through the bypass through rotation of the first rotary slide and at least partial coincidence of at least one rotary-slide pass-through opening of the first rotary slide with the bypass port.

7. The coolant circuit of claim 6, wherein the first rotary slide opens the bypass between a first threshold value of a coolant temperature and a second threshold value of a coolant temperature, and wherein the second rotary slide opens and closes the second branch of the primary cooling circuit in intervals.

8. The coolant circuit of claim 6, further comprising an oil cooler circuit routing coolant from the internal combustion engine via an oil cooler disposed in the oil cooler circuit to an oil cooler port of the rotary-slide housing, said first rotary slide controlling a flow of coolant through the oil cooler circuit, wherein the first rotary slide opens the bypass and the oil cooler circuit between a second threshold value of a coolant temperature and a third threshold value of the coolant temperature, and wherein the second rotary slide opens the second branch of the primary cooling circuit.

9. The coolant circuit of claim 6, further comprising an oil cooler circuit routing coolant from the internal combustion engine via an oil cooler disposed in the oil cooler circuit to an oil cooler port of the rotary-slide housing, said first rotary slide controlling a flow of coolant through the oil cooler circuit, wherein the first rotary slide opens between a third threshold value of a coolant temperature and a limit value of the coolant temperature the oil cooler circuit and opens and closes in intervals the first branch of the primary cooling circuit and the bypass to reach a target value of the coolant temperature, and wherein the second rotary slide opens the second branch of the primary cooling circuit.

10. The coolant circuit of claim 6, wherein first rotary slide opens during afterrun mode of operation after shutting down the internal combustion engine the first branch of the primary cooling circuit and closes the bypass, and wherein the second rotary slide closes the second branch of the primary cooling circuit.

11. The coolant circuit of claim 1, further comprising an oil cooler circuit routing coolant from the internal combustion engine via an oil cooler disposed in the oil cooler circuit to an oil cooler port of the rotary-slide housing, said first rotary slide controlling a flow of coolant through the oil cooler circuit through rotation of the first rotary slide and at least partial coincidence of at least one rotary-slide pass-through opening of the first rotary slide with the oil cooler port.

12. The coolant circuit of claim 1, wherein the second rotary slide closes the second branch of the primary cooling circuit at least in one of the phases selected from the group consisting of after starting the internal combustion engine, and below a first threshold value of a coolant temperature.

13. The coolant circuit of claim 1, further comprising a temperature measuring gauge to determine a coolant temperature in the first branch downstream of the internal combustion engine.

14. The coolant circuit of claim 1, wherein the first rotary slide is arranged in coaxial relationship to a suction port of the coolant delivery pump, and wherein the second rotary slide is arranged in axis-parallel relationship to the suction port of the coolant delivery pump.

15. The coolant circuit of claim 1, further comprising a servo drive to operate the first rotary slide, wherein the second rotary slide is operatively connected with the first rotary drive via at least one angle range, with the second rotary slide being operated by the first rotary slide.

16. The coolant circuit of claim 15, wherein the angle range is limited by stops which the second rotary slide impacts in the absence of an operative connection of the second rotary slide with the first rotary slide.

\* \* \* \* \*